US010749898B2

(12) United States Patent
Rogel et al.

(10) Patent No.: US 10,749,898 B2
(45) Date of Patent: Aug. 18, 2020

(54) RELAY ATTACK PREVENTION (71) Applicant: LEVL TECHNOLOGIES, INC, Palo Alto, CA (US)

(72) Inventors: Nuriel Rogel, Rehovot (IL); Gal Itzhak, Holon (IL)

(73) Assignee: LEVL TECHNOLOGIES, INC., Palo Alto, CA (US)

( * ) Notice: Subject to any disclaimer, the term of this patent is extended or adjusted under 35 U.S.C. 154(b) by 0 days.

(21) Appl. No.: 16/788,424

(22) Filed: Feb. 12, 2020

(65) Prior Publication Data

US 2020/0186565 A1 Jun. 11, 2020

Related U.S. Application Data (63) Continuation of application No. 16/514,029, filed on Jul. 17, 2019, now Pat. No. 10,594,727.
(Continued)

(51) Int. Cl.
*H04L 29/06* (2006.01)
*H04B 17/336* (2015.01)
*H04W 52/52* (2009.01)

(52) U.S. Cl.
CPC ....... *H04L 63/1466* (2013.01); *H04B 17/336* (2015.01); *H04L 63/1416* (2013.01); *H04W 52/52* (2013.01)

(58) Field of Classification Search
CPC ............ H04L 63/1416; H04L 63/1466; H04B 17/336; H04W 52/52
See application file for complete search history.

(56) References Cited

U.S. PATENT DOCUMENTS 5,893,031 A 4/1999 Hoogerwerf et al.
9,613,475 B2 * 4/2017 Zivkovic ............ G07C 9/00174
(Continued)

FOREIGN PATENT DOCUMENTS

CN 102693411 A 9/2012
CN 202906963 U 4/2013
(Continued)

OTHER PUBLICATIONS

Hou, Weikun, et al. "Physical Layer Authentication in OFDM Systems Based on Hypothesis Testing of CFO Estimates." In 2012 IEEE International Conference on Communications (ICC), pp. 3559-3563. IEEE, 2012.
(Continued)

*Primary Examiner* — Luat Phung
*Assistant Examiner* — Thomas R Cairns
(74) *Attorney, Agent, or Firm* — The Roy Gross Law Firm, LLC; Roy Gross (57) ABSTRACT

A system including at least one hardware processor; and a non-transitory computer-readable storage medium having stored thereon program instructions, the program instructions executable by the at least one hardware processor to: receive, using a first transceiver, a radio-frequency (RF) transmission from an RF device; extract, from said RF transmission, at least one of: (i) noise samples from one or more segments of said RF transmission, and (ii) signal samples from one or more segments of said RF transmission; and determine the presence of a second transceiver in the path of said RF transmission, based, at least in part, on processing said extracted noise samples and signal samples.

20 Claims, 5 Drawing Sheets

Related U.S. Application Data (60) Provisional application No. 62/699,030, filed on Jul. 17, 2018.

(56) References Cited

U.S. PATENT DOCUMENTS

| | | | |
|---|---|---|---|
| 9,893,886 | B2 | 2/2018 | Tercero |
| 10,291,436 | B2* | 5/2019 | Dutz .................... H04B 1/7174 |
| 2004/0120412 | A1 | 6/2004 | Banerjea |
| 2006/0273888 | A1 | 12/2006 | Yamamoto |
| 2007/0105520 | A1 | 5/2007 | Van Houtum |
| 2007/0264939 | A1 | 11/2007 | Sugar |
| 2009/0154627 | A1 | 6/2009 | Park et al. |
| 2010/0067546 | A1 | 3/2010 | Mishra et al. |
| 2010/0254475 | A1 | 10/2010 | Kawauchi et al. |
| 2016/0174072 | A1 | 6/2016 | Allyn |
| 2016/0226892 | A1 | 8/2016 | Sen et al. |
| 2017/0046299 | A1 | 2/2017 | Issac et al. |
| 2017/0328979 | A1 | 11/2017 | Franke et al. |
| 2018/0212635 | A1 | 7/2018 | Wicaksana et al. |
| 2019/0373537 | A1 | 12/2019 | Trainin et al. |

FOREIGN PATENT DOCUMENTS

| | | |
|---|---|---|
| CN | 105678273 A | 6/2016 |
| CN | 106961434 A | 7/2017 |
| EP | 2744162 B1 | 6/2015 |
| IN | 2005DE00388 A | 12/2006 |
| JP | 2010127833 A | 6/2010 |
| WO | 2014015970 A1 | 1/2014 |
| WO | 2017157563 A1 | 9/2017 |

OTHER PUBLICATIONS

Raboh, Mohamed S., et al., "Carrier Frequency Offset (CFO) Estimation Methods, A Comparative Study." 16th International Conference on Aerospace Sciences & Aviation Technology, ASAT, 2015.

Riyaz, Shamnaz Mohammed. "Radio Fingerprinting Using Convolutional Neural Networks." PhD dissertation, Northeastern University, 2018. Retrieved from the Internet: <URL: https://search.proquest.com/openview/78c8d5cb335b09d89ba51e28412473a6/1?cbl=18750&diss=y&pq-origsite=gscholar> Jul. 31, 2018 (Jul. 31, 2018) p. 1 section 1, p. 14 section 3.2, p. 27 section 4.2.1.7, p. 3 section 5.2, p. 18 section 4.1.

Vo-Huu, Tien Dang, et al., "Fingerprinting Wi-Fi Devices Using Software Defined Radios." In Proceedings of the 9th ACM Conference on Security & Privacy in Wireless and Mobile Networks, pp. 3-14. 2016. Jul. 18, 2016.

Notice of References from U.S. Office Action, U.S. Appl. No. 16/585,720, dated Nov. 12, 2019.

International Search Report, International Application No. PCT/IB2019/057207, dated Nov. 26, 2019.

International Search Report, International Application No. PCT/IB2019/056108, dated Dec. 12, 2019.

International Search Report, International Application No. PCT/IB2019/058170, dated Jan. 27, 2020.

Notice of References from U.S. Notice of Allowance and Fees Due, U.S. Appl. No. 16/551,914 dated Feb. 25, 2020.

Burzigotti, et al. (2010). Advanced receiver design for satellite-based AIS signal detection. pp. 1-8.

Chang, Dah-Chung. (2009). Least Squares/Maximum Likelihood Methods for the Decision-Aided GFSK Receiver. IEEE Signal Processing Letters, vol. 16, No. 6, Jun. 2009, pp. 517-520.

Mikhail B Tadjikov. (2010). Examination of Techniques for Carrier Frequency Estimation of Frequency Hopped Signals in Time Domain. A report submitted in partial satisfaction of the requirements for the degree Master of Science in Electrical Engineering. University of California, pp. 1-41.

Yan et al. (2013). ZIMO: Building cross-technology MIMO to harmonize zigbee smog with WiFi flash without intervention. Proceedings of the Annual International Conference on Mobile Computing and Networking, MOBICOM. pp. 465-476.

Chatterjee, et al. (2018). RF-PUF: Enhancing IoT Security through Authentication of Wireless Nodes using In-situ Machine Learning.

Polak, et al. (2011). Identifying Wireless Users via Transmitter Imperfections. Selected Areas in Communications, IEEE Journal on. 29. pp. 1469-1479.

Hanif Rahbari (2016). Obfuscation of Transmission Fingerprints for Secure Wireless Communications. Electronic Dissertation. Department of Electrical and Computer Engineering. The University of Arizona. pp. 1-171.

Rehman, et al. (2014). Radio frequency fingerprinting and its challenges. 2014 IEEE Conference on Communications and Network Security, CNS 2014, pp. 496-497.

Vo-Huu, et al. (2016). Fingerprinting Wi-Fi devices using software defined radios. In Proceedings of the 9th ACM Conference on Security & Privacy in Wireless and Mobile Networks. ACM, pp. 3-14.

Wang, et al. (2012). Watchdog Sensor Network with Multi-Stage RF Signal Identification and Cooperative Intrusion Detection. https://apps.dtic.mil/dtic/tr/fulltext/u2/a574098.pdf.

Phylaws (Id 317562), FP7-ICT-2011-call8, Security Solutions utilizing Physical Communication Layer, pp. 24-60, 2012.

Ignacio Fernández Hernández. (Jun. 2015). Thesis. Snapshot and Authentication Techniques for Satellite Navigation.

Psiaki, et al. (2016). GNSS Spoofing and Detection. Proceedings of the IEEE, 104(6), 1258-1270.

* cited by examiner

RELAY ATTACK PREVENTION

CROSS REFERENCE TO RELATED APPLICATIONS

This application is a continuation of U.S. patent application Ser. No. 16/514,029, filed Jul. 17, 2019, which claims the benefit of priority of U.S. Provisional Patent Application No. 62/699,030, filed Jul. 17, 2018. The contents of the above applications are all incorporated by reference as if fully set forth herein in their entirety.

FIELD OF THE INVENTION

The invention relates generally to the field of wireless communication systems.

BACKGROUND OF THE INVENTION

The use of wireless communication systems and their interconnections via networks have grown rapidly in recent years. Because radio frequency (RF) waves can penetrate obstacles, wireless devices can communicate with no direct line-of-sight between them. This makes RF communication easier to use than wired or infrared communication, but it also makes hacking and disrupting wireless RF communication easier than wired communication. For example, RF communications are vulnerable to man-in-the-middle (MITM) attacks, when an attacker secretly relays and possibly alters the communication between two devices (such as a paired Bluetooth device) who are made to believe they are directly communicating with each other. A relay attack is a type of MITM attack, where two transceivers are used, one near each element of the system under attack. Relay attacks may be performed by intercepting communication symbols and replaying at least a portion of the symbols. Because wireless RF communication can suffer from these threats, additional countermeasures are needed to protect against them.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising: at least one hardware processor; and a non-transitory computer-readable storage medium having stored thereon program instructions, the program instructions executable by the at least one hardware processor to: receive, using a first transceiver, a radio-frequency (RF) transmission from an RF device; extract one or more signal samples from said RF transmission, wherein said signal samples are associated with at least one of: (i) a rise transient associated with a data packet of said RF transmission, (ii) a fall transient associated with said data packet, and (iii) a region of said RF transmission occurring between said rise transient and said fall transient; and determine the presence of a second transceiver in the path of said RF transmission, based, at least in part, on processing said signal samples.

There is also provided, in an embodiment, a method comprising operating at least one hardware processor for: receiving, using a first transceiver, a radio-frequency (RF) transmission from an RF device; extracting one or more signal samples from said RF transmission, wherein said signal samples are associated with at least one of: (i) a rise transient associated with a data packet of said RF transmission, (ii) a fall transient associated with said data packet, and (iii) a region of said RF transmission occurring between said rise transient and said fall transient; and determining the presence of a second transceiver in the path of said RF transmission, based, at least in part, on processing said signal samples.

There is further provided, in an embodiment, a computer program product comprising a non-transitory computer-readable storage medium having program instructions embodied therewith, the program instructions executable by at least one hardware processor to: receive, using a first transceiver, a radio-frequency (RF) transmission from an RF device; extract one or more signal samples from said RF transmission, wherein said signal samples are associated with at least one of: (i) a rise transient associated with a data packet of said RF transmission, (ii) a fall transient associated with said data packet, and (iii) a region of said RF transmission occurring between said rise transient and said fall transient; and determine the presence of a second transceiver in the path of said RF transmission, based, at least in part, on processing said signal samples.

In some embodiments, said signal samples associated with said rise transient are extracted from a region of said RF transmission occurring before said rise transient; and said signal samples associated with said fall transient are extracted from a region of said RF transmission occurring after said fall transient.

In some embodiments, said processing comprises extracting a known first Automatic Gain Control (AGC) contribution associated with said first transceiver, to generate an estimated original waveform of said RF transmission, and said determining comprises determining whether said estimated original waveform comprises a second AGC contribution associated with said second transceiver.

In some embodiments, said processing comprises calculating at least one statistical parameter associated with a noise within said signal samples, and said determining comprises comparing said at least one statistical parameter with known reference parameters.

In some embodiments, said at least one statistical parameter is selected from the group consisting of: noise mean power, noise power variance, noise power distribution density, and noise power scale parameter.

In some embodiments, said determining is based, at least in part, on calculating a signal-to-noise (SNR) ratio between said noise and a signal portion of said RF transmission.

In some embodiments, said signal samples are extracted from a plurality of data packets, and wherein said statistical parameters are calculated with respect to all said data packets.

In some embodiments, said first transceiver comprises at least two antenna elements, and wherein said determining is based, at least in part, on a correlation between said signal samples extracted from said RF transmissions received by each of said at least two antennas elements.

In some embodiments, said second transceiver is one of a relay transceiver and a replay transceiver.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Disclosed herein are a system, method, and computer program product for the detection of relay and/or replay attacks, by analyzing a transient component of a transmitted radio frequency (RF) signal.

In some embodiments of the present invention, an attack may be detected based, at least in part, on detecting and analyzing sections of the RF transmission known as the transients. In some embodiments, the present invention may be configured for analyzing the rise region of the transient. The rise transient has a length which depends on the waveform used in the communications system, as well as on other parameters such as the signal bandwidth and/or the type of amplifier used by the transmitter. The rise transient typically comprises significant changes in frequency, amplitude and phase of the signal. Generally, using the rise transient region of the signal for RF fingerprinting may be preferable to using regions which include mostly channel noise or otherwise steady-state regions. Typically, the relay or replay transceiver recording the signal uses an AGC (Automatic Gain Control) circuit for continuous and high-quality reception during the full transmission. An AGC circuit is a closed-loop feedback regulating circuit which provides a controlled signal amplitude at its output, regardless of the amplitude in the input signal. Thus, a signal relayed in a relay attack will have passed through two AGC stages—the first at the relay device, and the second at the receiving device. The cumulative effect of the signal being recorded following an AGC circuit, and then being retransmitted and recorded again following an additional AGC circuit, causes distinctive distortion at the rise transient section of the signal.

In some embodiments, the present invention may be further configured for detecting a relay-replay based, at least in part, on noise samples acquired from one or more portions of the received signal, including before the beginning of the rise transient, after the fall transient, and from frequencies out of the signal bandwidth during the data transmission section.

A potential advantage of the present invention is, therefore, in that it may provide for detection of relay attacks based upon analysis of the received RF transmission. The disclosed method is easy to use, reliable, and cost effective. In addition, it does not require any additional hardware, and has no significant negative effect on the size, power consumption, and/or price of the RF device being authenticated.

The present system may be applied in the area of keyless entry systems, also known as passive-entry-passive start (PEPS) systems, which are installed mainly in vehicles. Other areas of application may include secure access systems, e.g., for buildings and facilities, and wireless payment systems, which may be based on data carriers such as chip cards, smartphone applications, or passive keyless entry cards.

Figure 1:
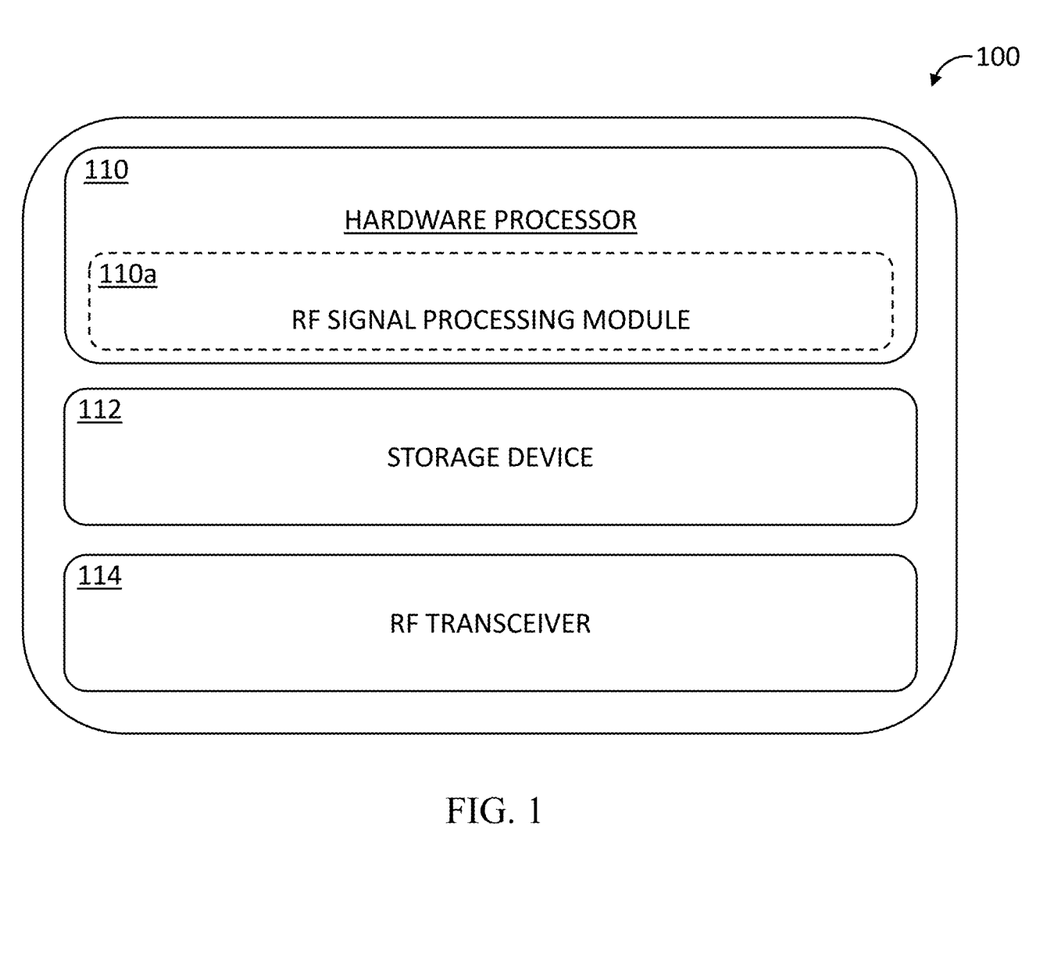
FIG. 1 is a block diagram of an exemplary system for identification and authentication of a radio frequency (RF) device, based on RF fingerprinting, according to an embodiment.

FIG. 1 is a block diagram of an exemplary system 100 for detecting relay attacks. System 100 as described herein is only an exemplary embodiment of the present invention, and in practice may have more or fewer components than shown, may combine two or more of the components, or may have a different configuration or arrangement of the components. The various components of system 100 may be implemented in hardware, software or a combination of both hardware and software. In various embodiments, system 100 may comprise one or more dedicated hardware devices, or may form an addition to or extension of an existing device, a vehicle operating system, and the like.

In some embodiments, system 100 may comprise a hardware processor 110, RF signal processing module 110a, non-transitory computer-readable memory storage device 112, and RF transceiver 114 configured for handling both transmitted and received RF signals. System 100 may store in storage device 112 software instructions or components configured to operate a processing unit (also "hardware processor," "CPU," or simply "processor"), such as hardware processor 110. In some embodiments, the software components may include an operating system, including various software components and/or drivers for controlling and managing general system tasks (e.g., memory management, storage device control, power management, etc.), and facilitating communication between various hardware and software components. In addition, system 100 may include such other components as one or more antenna elements, digital-to-analog (DAC) converters, amplification modules, and the like. In other embodiments, system 100 may also contain one or more accelerometers, a Global Positioning System (GPS) receiver and related circuitry, and data transmission circuitry, such as a Wi-Fi transceiver.

The software instructions and/or components operating hardware processor 110 may include instructions for processing and analyzing RF signals received by RF transceiver 114. For example, RF signal processing module 110a may be configured for performing fingerprinting of other RF devices, by extracting certain sections and/or features of the signal using a variety of signal processing methods, which will be discussed in detail below. RF signal processing module 110a may apply for this purpose a variety of algorithms and methods, such as Principal Component Analysis (PCA), neural network applications, convolutional neural networks (CNNs), support vector machine (SVM) models, Self-Organizing Maps, Learning Vector Quantization (LVQ) methods, Discrete Wavelet Transform (DWT) parameters, a Bayesian filter, and/or a Kalman filter. In some embodiments, system 100 is configured for storing RF fingerprints obtained by RF signal processing module 110a in storage device 112. Thus, system 100 may build a database of recognized RF devices, e.g., within a network of devices.

The following discussion will focus on applications in the area of Bluetooth communications and related protocols, such as Bluetooth Low Energy (BLE). However, the working principles of the present invention are applicable with respect to a wide variety of RF communication protocols in all bands used in communications.

Figure 3:
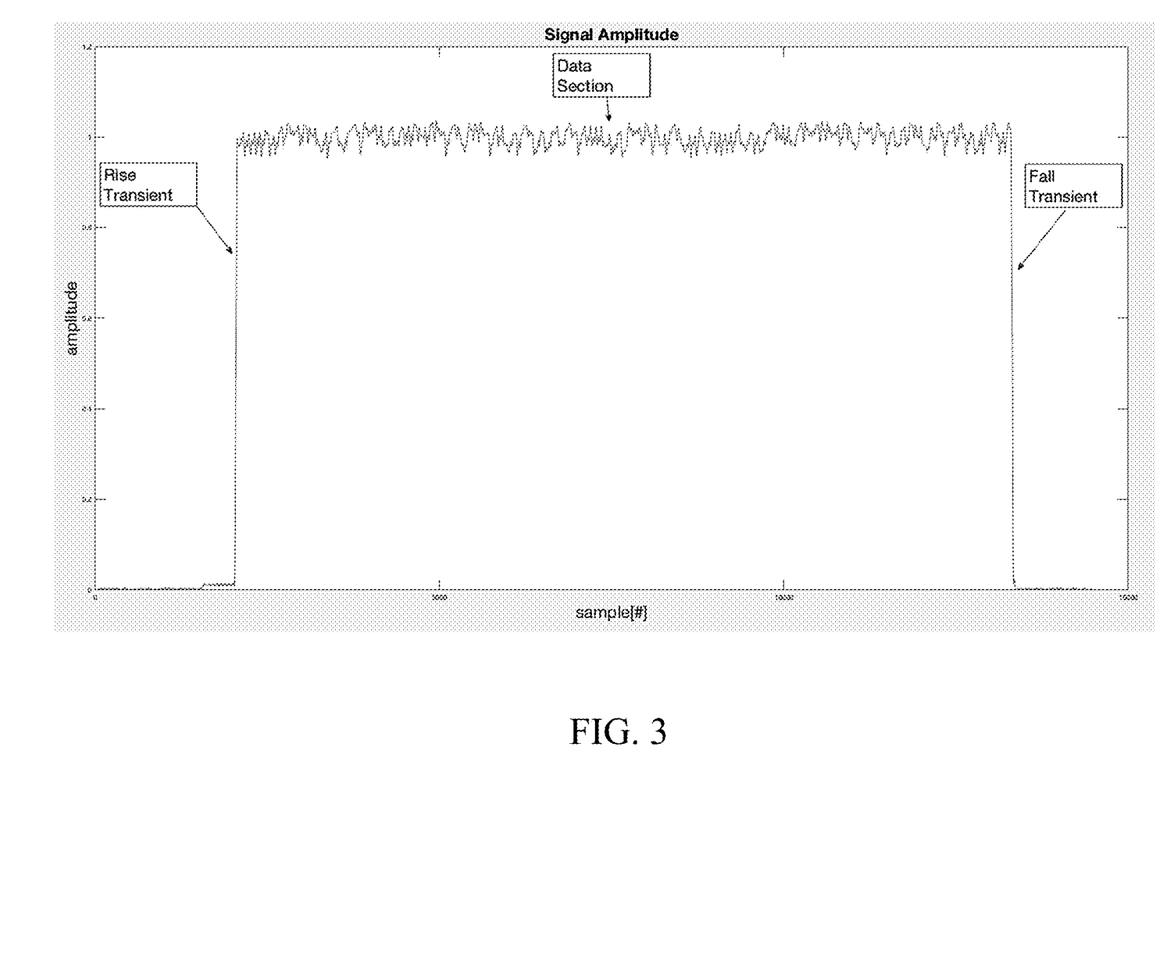
FIG. 3 illustrates a typical Bluetooth signal with both rise and fall transients bookending the main data section.

In some embodiments, a system, such as system 100, may be configured for detecting a section of the device's signal known as the rise transient. The rise transient comprises significant changes in frequency, amplitude and phase of the signal. Thus, using the rise transient region of the signal for RF fingerprinting may be preferable to using regions which include mostly channel noise or otherwise steady-state regions. FIG. 3 illustrates a typical Bluetooth signal with both rise and fall transients bookending the main data section. In some embodiments, system 100 may use known methods for detecting the rise transient in a data packet of an RF signal, such as the ones disclosed in Pasanen, S. et al.; "New Efficient RF Fingerprint-Based Security Solution for Bluetooth Secure Simple Pairing"; Proceedings of the 43rd Hawaii International Conference on System Sciences—2010.

Figure 2:
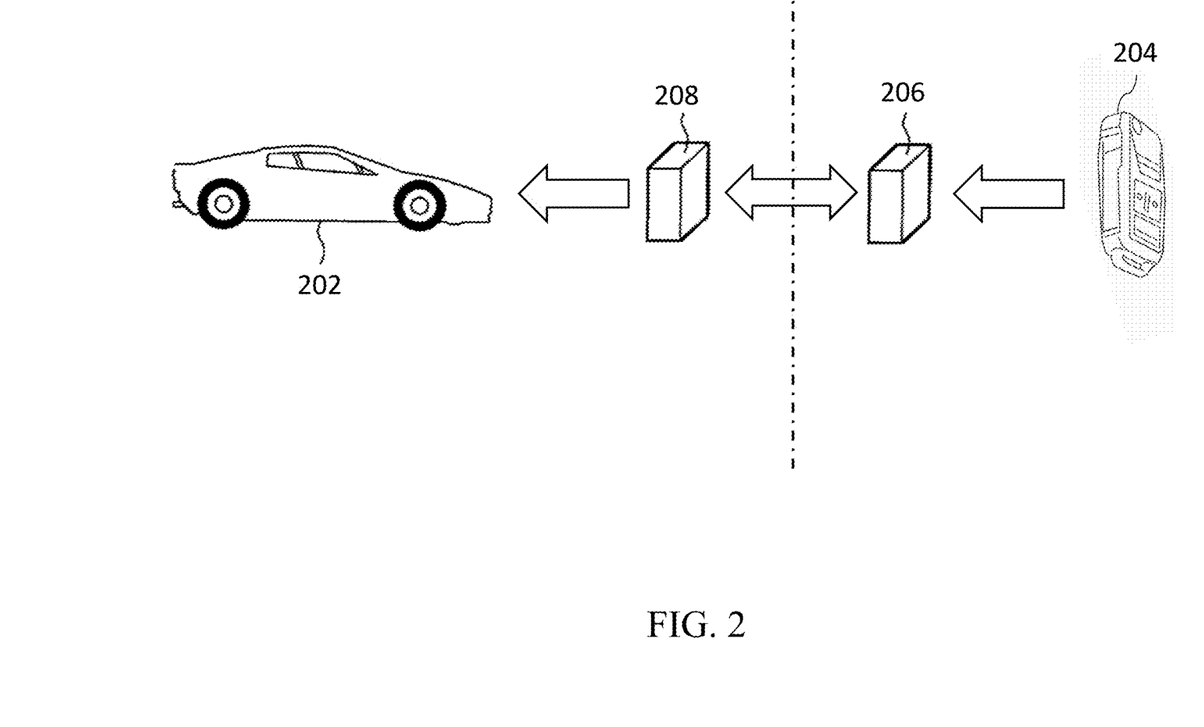
FIG. 2 illustrates a schematic representation of a relay attack.

Rise transient-based detection may be particularly useful in detecting and thwarting relay/replay attacks. A relay attack is a type of a Man-in-the-Middle attack, whereby hackers may use two transceivers, one near each element of the system under attack, to relay a signal in real time. A replay attack is similar to a relay attack, however, the signal is first recorded and then replayed near the target of the attack the signal. FIG. 2 is a schematic representation of a typical relay attack. A first relay transceiver 206, located, e.g., near a house, receives a wireless signal transmitted by an authorized RF device inside the house, such as a key fob 204 (which may be any mobile device, such as a smartphone). First relay transceiver 206 transmits the recorded signal to a second relay transceiver 208, located near target vehicle 202. Second relay transceiver 208 then transmits the sample to the target so as to mislead vehicle 202 to believe that key fob 204 is located nearby and thus gain access to vehicle 202. In order to successfully mislead the receiver to believe that the transmission originated in an authorized device, second transceiver 208 will typically transmit the signal as faithfully as possible, based on the received signal from first transceiver 206. The transmitted signal will typically begin from the start of the rise transient of a packet. However, in some cases, the transmission may include samples received prior to the start of the signal. The transmission typically will end with the fall transient, but may also include subsequent signal samples recorded after the fall transient. In a replay attack variation, a car thief may use, e.g., a single transceiver to first record the signal from the keyless entry fob near the house, and then replay the recording in the vicinity of the vehicle.

Typically, the relay recording of the signal uses an AGC (Automatic Gain Control) circuit for consistent recording during the transmission. An AGC circuit is a closed-loop feedback regulating circuit which provides a controlled signal amplitude at its output, regardless of the amplitude in the input signal. Thus, a signal relayed in a relay attack will have passed through two AGC stages—the first at the relay device and the second at the receiving device. The cumulative effect of the signal being recorded following an AGC circuit, and then being retransmitted and recorded again following an additional AGC circuit, produces a distinctive distortion at the rise transient section of the signal.

Figure 4A:
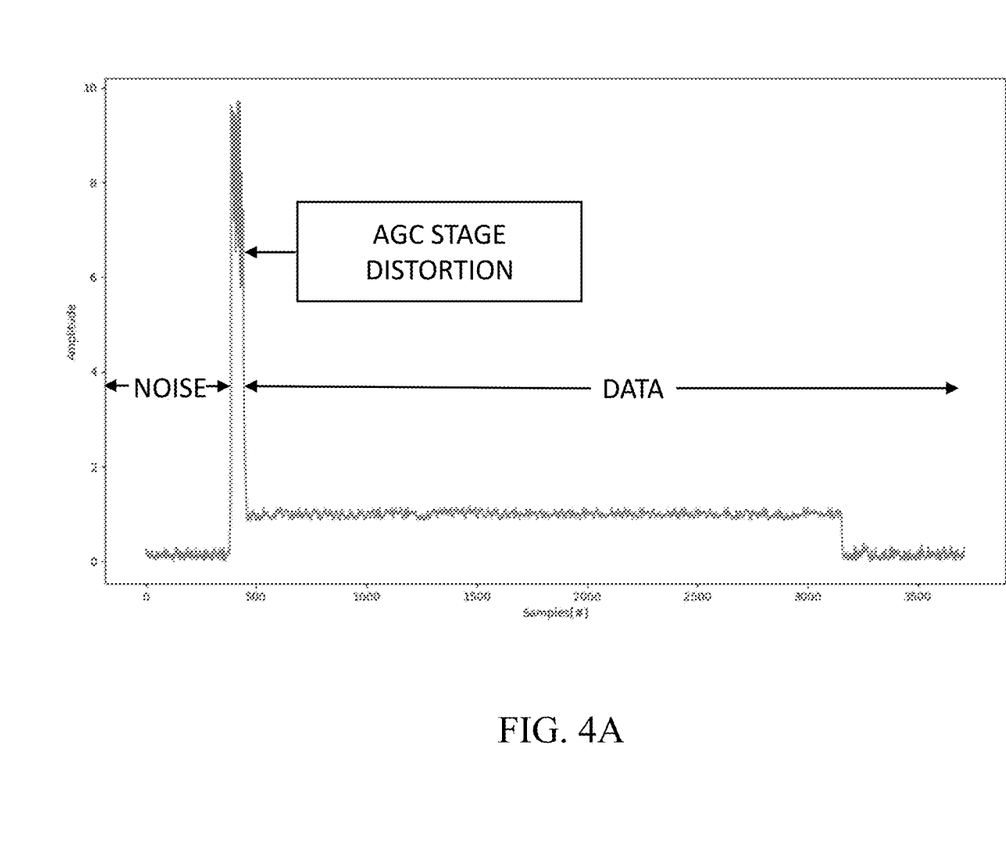
FIG. 4A illustrates a rise transient distortion caused by an AGC stage.

Accordingly, in some embodiments, system 100 may be configured for detecting a transmission by a relay attack transceiver, based, at least in part, on a unique distortion pattern which manifests in the rise transient of the signal, as a result of passing through two AGC stages. FIG. 4A illustrates the distortion spike in the amplitude of a signal caused by an AGC circuit.

Figure 4B:
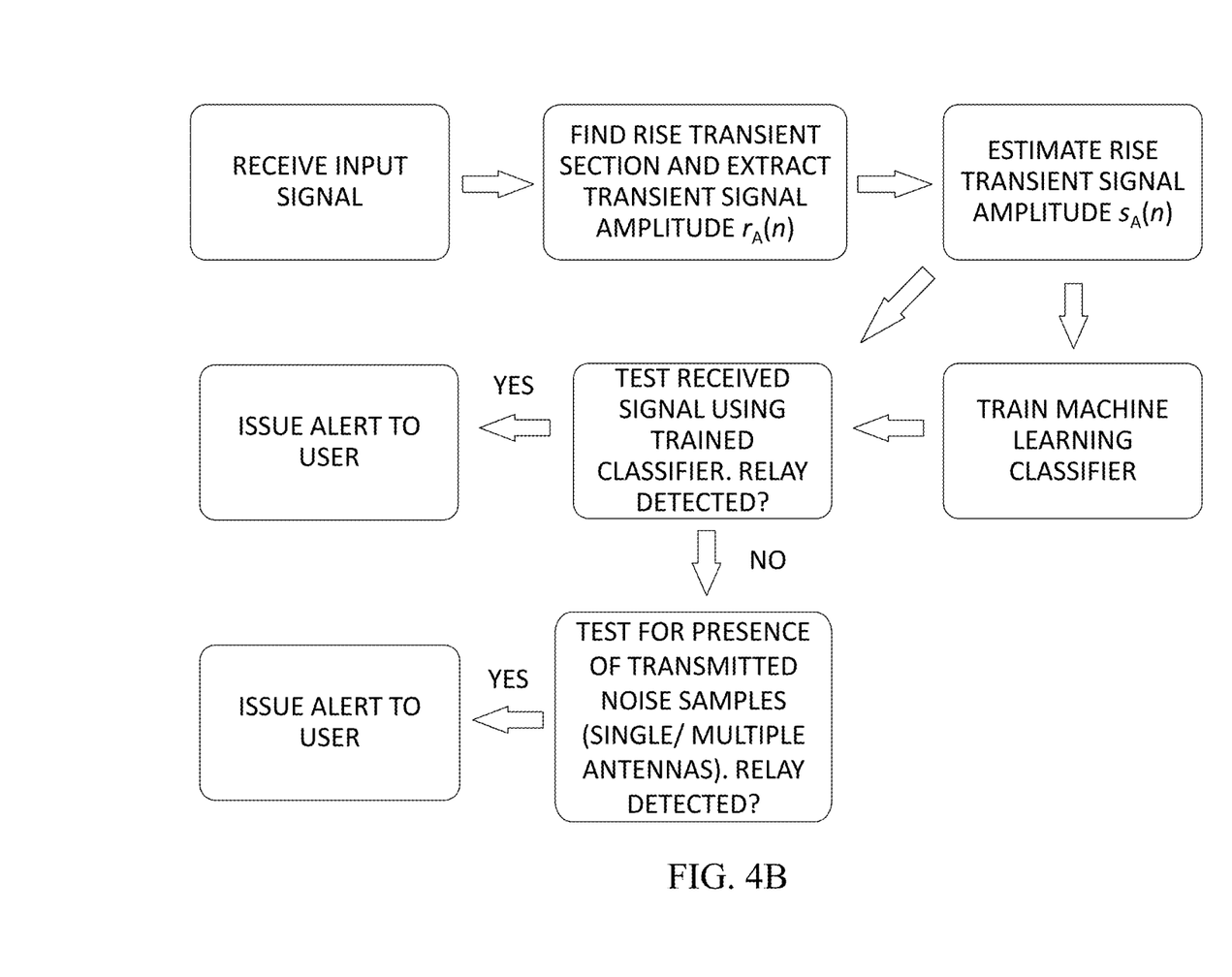
FIG. 4B is a block diagram of a method for detecting a relay attack based on transient distortion, according to an embodiment.

With reference to FIG. 4B, in some embodiments, system 100 may be configured for detecting the double-AGC distortion effect based on the following process:

(i) Finding and extracting the rise transient from the beginning through to the start of the data region;
(ii) estimating and removing the differential AGC distortion caused by the receiver, based on the known output of its AGC circuit; and
(iii) determining whether the remaining signal exhibits AGC distortion from a relay/replay AGC stage.

In some embodiments, in step (ii), system 100 does not remove the differential AGC distortion, but rather compares a known output behavior of an AGC circuit of the receiver to the received signal, to determine whether the received signal exhibits AGC distortion from a relay/replay AGC stage.

In some embodiments, step (i) of the process detailed above may be performed using a number of different techniques. One such technique uses a measure of mean power of a complex column sample vector IQ:

$$P(IQ) = \left(\frac{1}{w}\right) IQ^H IQ,$$

where $IQ^H$ is the conjugate transpose of vector IQ. The beginning of the rise transient is then defined as the first rise in the signal amplitude above a threshold, $$r_A(n) > \text{Threshold} = C\sqrt{P(IQ_N)},$$

where $r_A(n)$ is the amplitude of the signal while n denotes the time index, $IQ_N$ is a complex noise sample vector before the presence of a signal, and C=2. The end of the extracted rise transient is taken as the end of the rise amplitude.

Step (ii) may then use the output of the AGC circuit within the receiver in order to remove (or cancel out) its distortion from the rise transient signal amplitude detected in the first stage, by $$s_A(n) = \frac{r_A(n)}{AGC(n)}, \forall n,$$

where $s_A(n)$ is the estimated signal amplitude, and AGC(n) is the AGC circuit output (i.e., gain at time n). Accordingly, in some embodiments, system 100 may use this preprocessing algorithm to determine the actual signal waveform, before being processed by transceiver 114. System 100 may then be configured for determining whether the new $s_A(n)$ signal has a 'clean' rise transient or one which has been distorted by a previous AGC (see FIG. 3). If the rise transient is clean, then system 100 may determine that the signal was not relayed/replayed. If the signal appears to have been otherwise distorted by a previous AGC stage, system 100 may conclude that the signal was relayed/replayed. In some embodiments, system 100 may employ one or more known machine learning classifiers for detecting such AGC-distorted signals. Such machine learning classifiers may be trained on a training set which comprises, e.g., 'clean' signals which are undistorted by AGC stages. In some variations, such training set may also include distorted signals.

In some embodiments, system 100 may be configured for determining whether a signal was relayed/replayed through a supplementary relay/replay attack test involving retransmitted noise samples. For that purpose, noise samples (denoted $IQ_{Noise}$) may be taken from three portions of the received signal:
(i) Before the beginning of the rise transient,
(ii) after the fall transient, and
(iii) from frequencies out of the signal bandwidth during the data transmission section.

These samples may be extracted using, e.g., a high pass filter over the samples during the data section transmission, where the high pass filter has a cutoff frequency that is higher than the bandwidth of the signals.

In some embodiments, a statistic of the noise samples ($v[n] \triangleq IQ_{Noise}$) can be used for detection of a relay/replay, such as the noise mean power or the noise statistics. This statistic can be estimated by assuming an underlying Rayleigh model within these samples' amplitude, and performing a parameter ($\sigma$) estimation either by an ML (Maximum Likelihood) approach, by the method of moments (MoM), and/or by any other method.

The Maximum Likelihood estimator for the Rayleigh model $\sigma$ parameter is then $$\sigma_{ML} = \sqrt{\frac{1}{2N}\sum_{n=1}^{N}|v[n]|^2}$$

where $v[n]$ is the n-th noise sample of the complex noise.

In some embodiments, an alternative way to estimate the $\sigma$ parameter would be to assume an underlying real normal model within each of the I and Q channels, calculate their respective variances, average, and take their squared root. Then, this statistic/measure (or its distribution) are compared to a predefined threshold (or distribution). Accordingly, if $$\sigma_{ML} > \text{threshold},$$

or $$p_\sigma(\sigma_{ML}) \le p_{threshold},$$

where $p_\sigma$ is the predefined distribution of the $\sigma$ parameter, $p_{threshold}$ is a probability threshold determined by the system requirements, then the signal may be determined to be the product of a relay/replay transceiver.

In some embodiments, system 100 may be configured for detecting a relay/replay attack based on a calculated autocorrelation of the noise samples. As known to those skilled in the art, in the case of a multipath channel, such as a wireless channel transmission, multiple copies of a signal may travel different paths with different propagation delays. These multiple copies are then received at the receiver at different phase angles and strengths. Thus, a multipath channel can be viewed as a linear time variant system where the parameters change randomly with respect to time. Because the values for the channel impulse response are samples of a random process, a general autocorrelation function can be calculated.

Conversely, when noise samples, such as those described above, are extracted in the absence of a relay/replay component in their path, they represent noise generated solely by the receiver, and thus do not represent a multipath-related autocorrelation. Accordingly, when the noise samples reflect the presence of a relay/replay transceiver in the path of the signal, an autocorrelation function can be calculated based on the noise samples. In some embodiments, system 100 may be configured for calculating an autocorrelation based on the noise samples, as $$E_{dt}\{E_t\{N(t)*N^c(t+dt)\}\} > T\text{threshold}_1 + d,$$

here, $N(t)$ denotes a vector containing noise samples, t denotes the time index, and dt is any number bigger than 0 and denotes the time-difference. Superscript c denotes the complex conjugate, $E_t$ denotes expectation with respect to time, and $E_{dt}$ denotes expectation with respect to time-difference. Threshold$_1$ may be a parameter configured for this specific test, and may be set as $$\text{Threshold}_1 = E_{dt}\{E_t\{W(t)*W^c(t+dt)\}\},$$

where $W(t)$ is the noise sample at time instance t of the receiver in normal operation mode, when there is no signal detected, and d is a parameter which is set by system 100 and may control the false positive and false negative performance of the system.

In some embodiments, system 100 may comprise two or more antenna elements configured for received RF transmissions. In such cases, the presence of a relay transceiver may be determined based on the correlation between noise samples from the two or more antennas. Let $IQ_{Noise}^k$ be column vector which denotes the received noise samples from antenna k. A correlation measure of the noise signals among the various antennas may then be given by $$R_{kl}(IQ^k, IQ^l) = \frac{(IQ^k)^H IQ^l}{\sqrt{((IQ^k)^H IQ^k ((IQ^l)^H IQ^l)}},$$

where H is the Hermitian (complex conjugate and transpose) operation. If $R_{kl} > \text{Threshold}_2$, the noise between different antennas are correlative, and the signal is from a relay. Threshold$_2$ is taken as 2 multiplied by the measured correlation between antennas when there is no received signal.

In some embodiments, system 100 may use noise samples received from multiple, but not necessarily successive, packets in time for detecting a relay/replay. Accordingly, for each packet i a statistic of the noise samples $\sigma_i(v)$ is estimated as detailed above. Then, this statistic is analyzed as a time series whose properties are compared to those of a reference valid series. For example, one can compare the mean, the variance, and/or any other moment over the entire series, or parts of the series in overlapping or non-overlapping windows. any anomaly may detect an instability or over-stability of the standard noise, and hence imply an existence of a relay.

In some embodiments, the signal section, $y[n]$ (i.e., samples between the rise transient and the fall transient) can be used as a relay/replay detection test in addition to the noise samples. The noise samples can be used to estimate the noise power $P_N = 2\sigma_{ML}^2$, as detailed above, or by methods that estimate the noise power from the signal section. The noisy signal power can be estimated, e.g., by $$P_y = \frac{1}{N}\sum_{n=1}^{N}|y[n]|^2.$$

Finally, the SNR is obtained by $$SNR = \frac{P_y - P_N}{P_N}.$$

This SNR estimate, incorporated with the estimated RSSI measure $P_y$ or an independent RSSI measure which may be obtained for instance by the AGC mechanism, may be then compared to a predefined SNR-RSSI functional relation.

In some embodiments, such comparison may identify either an increase or a decrease in either the SNR or the RSSI. Under valid conditions, i.e., when no relay attack takes place, any change in one of these measures should be correlated to a change in the complementary measure. Any anomaly, for example a significant detected increase in the RSSI with no apparent increase in the SNR, would imply an existence of a relay.

In some embodiments, system 100 may be configured for issuing a suitable alert to the user when system 100 determines that a received transmission originated in a relay device. For example, in the case of a keyless entry system of a vehicle, system 100 may be configured for initiating the vehicle's alarm, sending a suitable notification to the vehicle's owner and/or to a central monitoring or security function, and/or disabling or immobilizing the vehicle.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
   at least one hardware processor; and
   a non-transitory computer-readable storage medium having stored thereon program instructions, the program instructions executable by the at least one hardware processor to:
   receive, using a first transceiver, a radio-frequency (RF) transmission from an RF device;
   extract, from an original wavefoam of said RF transmission, noise samples associated with at least one of:
   (i) a portion of said RF transmission before the beginning of a rise transient thereof, and
   (ii) a portion of said RF transmission after a fall transient thereof; and
   determine the presence of a second transceiver in the path of said RF transmission, based, at least in part, on processing said extracted noise.

2. The system of claim 1, wherein (i) said processing of said noise samples comprises calculating at least one statistical parameter associated with said noise samples, and (ii) said determining is based on a comparison between said at least one statistical parameter and known reference parameters.

3. The system of claim 2, wherein said at least one statistical parameter is selected from the group consisting of: noise mean power, noise power variance, noise power distribution density, and noise power scale parameter.

4. The system of claim 1, wherein said determining is based, at least in part, on calculating a signal-to-noise (SNR) ratio between said noise samples and said signal samples.

5. The system of claim 1, wherein (i) said processing comprises extracting a known first Automatic Gain Control (AGC) contribution associated with said first transceiver, to generate an estimated original waveform of said RF transmission, and (ii) said determining comprises determining whether said estimated original waveform comprises a second AGC contribution associated with said second transceiver.

6. The system of claim 1, wherein said transceiver comprises at least two antennas configured to receive said RF transmission, wherein said extracting comprises extracting said noise samples from said RF transmission received by each of said at least two antenna, wherein said processing comprises calculating a correlation measure of said noise samples in each of said RF transmission received by each of said to or more antennas, and wherein said determining is based on comparing said correlation measure to a known reference value.

7. The system of claim 1, wherein said RF transmission comprises a plurality of data packets, wherein said extracting comprises extracting said noise samples from at least some of said plurality of data packets, wherein said processing comprises creating a time series comprising at least one statistical parameter associated with each of said noise samples in said plurality of data packets, and wherein said determining is based on comparing said time series to a known reference time series.

8. A method comprising:
   receiving, using a first transceiver, a radio-frequency (RF) transmission from an RF device;
   extracting, from an original waveform of said RF transmission, noise samples associated with at least one of:
   (i) a portion of said RF transmission before the beginning of a rise transient thereof, and
   (ii) a portion of said RF transmission after a fall transient thereof; and
   determine the presence of a second transceiver in the path of said RF transmission, based, at least in part, on processing said extracted noise samples.

9. The method of claim 8, wherein (i) said processing of said noise samples comprises calculating at least one statistical parameter associated with said noise samples, and (ii) said determining is based on a comparison between said at least one statistical parameter and known reference parameters.

10. The method of claim 9, wherein said at least one statistical parameter is selected from the group consisting of: noise mean power, noise power variance, noise power distribution density, and noise power scale parameter.

11. The method of claim 8, wherein said determining is based, at least in part, on calculating a signal-to-noise (SNR) ratio between said noise samples and said signal samples.

12. The method of claim 8, wherein (i) said processing comprises extracting a known first Automatic Gain Control (AGC) contribution associated with said first transceiver, to generate an estimated original waveform of said RF transmission, and (ii) said determining comprises determining whether said estimated original waveform comprises a second AGC contribution associated with said second transceiver.

13. The method of claim 8, wherein said transceiver comprises at least two antennas configured to receive said RF transmission, wherein said extracting comprises extracting said noise samples from said RF transmission received by each of said at least two antenna, wherein said processing comprises calculating a correlation measure of said noise samples in each of said RF transmission received by each of said to or more antennas, and wherein said determining is based on comparing said correlation measure to a known reference value.

14. The method of claim 8, wherein said RF transmission comprises a plurality of data packets, wherein said extracting comprises extracting said noise samples from at least some of said plurality of data packets, wherein said processing comprises creating a time series comprising at least one statistical parameter associated with each of said noise samples in said plurality of data packets, and wherein said determining is based on comparing said time series to a known reference time series.

15. A computer program product comprising a non-transitory computer-readable storage medium having program instructions embodied therewith, the program instructions executable by at least one hardware processor to:
    receive, using a first transceiver, a radio-frequency (RF) transmission from an RF device;
    extract, from an original waveform of said RF transmission, noise samples associated with at least one of:
        (i) a portion of said RF transmission before the beginning of a rise transient thereof, and
        (ii) a portion of said RF transmission after a fall transient thereof; and
    determine the presence of a second transceiver in the path of said RF transmission, based, at least in part, on processing said extracted noise samples.

16. The computer program product of claim 15, wherein (i) said processing of said noise samples comprises calculating at least one statistical parameter associated with said noise samples, and (ii) said determining is based on a comparison between said at least one statistical parameter and known reference parameters.

17. The computer program product of claim 16, wherein said at least one statistical parameter is selected from the group consisting of: noise mean power, noise power variance, noise power distribution density, and noise power scale parameter.

18. The computer program product of claim 15, wherein (i) said processing comprises extracting a known first Automatic Gain Control (AGC) contribution associated with said first transceiver, to generate an estimated original waveform of said RF transmission, and (ii) said determining comprises determining whether said estimated original waveform comprises a second AGC contribution associated with said second transceiver.

19. The computer program product of claim 15, wherein said transceiver comprises at least two antennas configured to receive said RF transmission, wherein said extracting comprises extracting said noise samples from said RF transmission received by each of said at least two antenna, wherein said processing comprises calculating a correlation measure of said noise samples in each of said RF transmission received by each of said to or more antennas, and wherein said determining is based on comparing said correlation measure to a known reference value.

20. The computer program product of claim 15, wherein said RF transmission comprises a plurality of data packets, wherein said extracting comprises extracting said noise samples from at least some of said plurality of data packets, wherein said processing comprises creating a time series comprising at least one statistical parameter associated with each of said noise samples in said plurality of data packets, and wherein said determining is based on comparing said time series to a known reference time series.

\* \* \* \* \*